Figure 2:
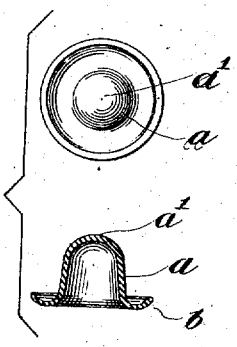

No. 12,008.

J. C. RHODES.

EYELET.

(Application filed Jan. 11, 1902.)

Reissued July 8, 1902.

WITNESSES:

D. A. Berrigan Jr.

Delos Holden.

INVENTOR

JOHN C. RHODES,

BY

Betts Betts Sheffield & Betts

HIS ATTORNEYS.

UNITED STATES PATENT OFFICE.

JOHN C. RHODES, OF NEW BEDFORD, MASSACHUSETTS, ASSIGNOR, BY MESNE ASSIGNMENTS, TO J. C. RHODES & CO., INCORPORATED, A CORPORATION OF MAINE.

EYELET.

SPECIFICATION forming part of Reissued Letters Patent No. 12,008, dated July 8, 1902.

Original No. 565,091, dated August 4, 1896. Application for reissue filed January 11, 1902. Serial No. 89,386.

*To all whom it may concern:*

Be it known that I, JOHN C. RHODES, of New Bedford, county of Bristol, State of Massachusetts, have invented an Improvement in Eyelets, of which the following description, in connection with the accompanying drawings, is a specification, like letters on the drawings representing like parts.

This invention relates to flanged metal eyelets used in connection with the manufacture of boots, shoes, and for other like purposes.

My invention is especially adapted to flanged eyelets having the face-flange rolled over to form a suitable facing for the eyelet when set. Prior to my invention eyelets of this type have been formed with a tubular shank or body, with the face-flange or lip simply rounded or rolled outwardly and resting at its edge against the leather when the fastening is set. After the eyelets are formed they are usually covered with a coating of japan or other pigment to present a smooth and finished appearance. In practice, however, when setting such eyelets the face-flange or lip yields or changes its form under the action of the setting instruments to such extent as would crack a hard thick coat of japan or covering material, making it necessary to use a thin and very elastic coating, so thin, in fact, that in practice the said coating soon wears through to the metal of the eyelet, which, if of brass, as is usually the case, leaves a bright spot or ring at the face of the eyelet, making the same conspicuous and objectionable. To avoid this difficulty, it is now common to provide eyelets with a cap, of celluloid or other equivalent material, attached to the face-flange, of sufficient thickness to hold its shape in setting; but such eyelets are expensive and objectionable in other ways.

The object of this present invention is to construct an eyelet of the class referred to in such a manner as will obviate the springing or yielding of the face-flange or lip referred to, to thereby enable a sufficiently thick and hard surface-coating of japan or other pigment to be employed without danger of cracking or breaking the same during the setting operation. This object I attain by providing the face-flange with a downturned peripheral portion having a stiffening-lip, preferably continuous and preferably turned inwardly beneath or within the face-flange, such stiffening-lip acting in practice to stiffen and prevent any yield or movement of the face-flange during the setting operation.

Figure 4:
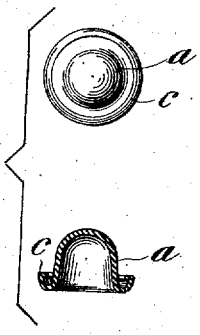
Figure 5:
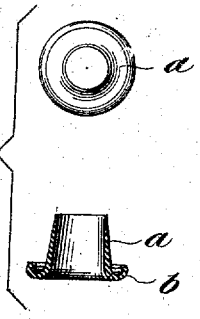
Figure 1:
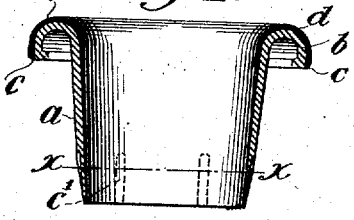
Figure 1A:
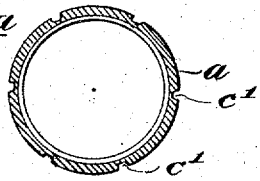

In the drawings, Figure 1, on an enlarged scale, is a vertical section of an eyelet embodying my invention. Fig. $1^a$ is a transverse section on the line $x\,x$, Fig. 1; Fig. 2, top and sectional views, respectively, of a blank from which an eyelet is made embodying my present invention; and Figs. 3, 4, and 5, similar views illustrating different steps in the method by which my improved eyelet is preferably constructed.

Figure 3:
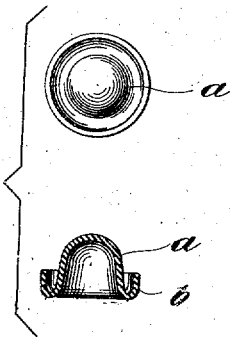

Referring to the drawings, Fig. 2, the blank there shown consists of a tubular body $a$, having a usual face-flange $b$, the said tubular body being closed at its end $a'$. Such a blank is substantially such as is used at the present time in the formation of eyelets with a curved flange, the face-flange $b$ in the completed eyelet being usually rolled or rounded slightly more than is there shown. The edge of the face-flange $b$ may now be turned, as shown in Fig. 3. I next in suitable dies turn at an abrupt angle or short curve, and preferably under or inwardly, the lip or edge of the face-flange $b$ to form thereby a pressure-receiving and stiffening lip $c$. (See Fig. 4.) The closed end of the body $a$ is then punctured and opened or swaged, thereby thinning the shank, as shown in Fig. 1, and preferably the small end of the tubular body is longitudinally scored, as at $c'$, Figs. 1 and $1^a$, forming the completed eyelet, which is then covered with a suitable coating of japan or other usual covering material. I prefer to provide at the inner or shank end of the tube a plurality of longitudinal lines of weakness, herein shown as formed by longitudinal scorings; but the shank may be grooved or cut in any other way. These scorings or lines of weakness enable the setting of the eyelet to be accomplished with less pressure, and also cause the eyelet to hold more firmly than it would otherwise.

The auxiliary or additional strengthening flange or lip described strengthens or stiffens the face-flange and receives the pressure to such an extent that the latter will not change its form or yield to the thrust of said pressure during the operation of setting the eyelet, thereby enabling me to apply to the fastener as thick and as hard a surface-coating *d* as may be necessary to stand the usual use required without wearing through to the surface of the metal eyelet proper.

I am aware that prior to my invention gromets for sails and other purposes having a turned-over flange have been described and used. Such gromets are shown and described in United States Letters Patent to W. W. Wilcox, No. 304,249, dated August 26, 1884; but these gromets were intended to have their flanges distorted or changed in shape when applied by clenching, and hence were not adapted to receive a thick coating of japan or other material liable to crack. I am also aware of the patent of M. D. Shipman, No. 350,020, dated September 28, 1886, which illustrates a button made up of several metallic pieces, in which one of the parts of the unfinished button resembles an eyelet in shape, but it is not japanned or otherwise covered, nor is the shank intended to be clenched, nor is the structure adapted otherwise to perform the functions of an eyelet. These structures I disclaim, but I believe myself to be the first to construct a tubular eyelet suitably coated, as above described, and adapted to be applied to boots, shoes, &c., by being provided at one end with a turned flange having an abruptly-turned seating and strengthening lip and at the other with an open shank, which will yield under a pressure insufficient to distort such flange.

The additional stiffening and pressure-receiving lip referred to also prevents cutting the leather, as by the usually sharp edge of the face-flange.

While I have found the method described an excellent one for the production of my novel eyelet and fastener, yet my invention is not limited to such method alone.

I claim—

1. A coated eyelet, as described, consisting of a tubular body rolled outwardly and over at one end to form a flange, presenting within the same a smooth flaring entrance, the peripheral edge of the said flange being turned or bent abruptly at an angle to form a ring-like seat-lip outside the body, and adapted to rest upon the material in which the eyelet is set, to thereby receive the setting pressure and stiffen the eyelet-flange to prevent cracking of its surface or finishing coating, said eyelet also having a plurality of lines of weakness at its clenching end, substantially as described.

2. A coated eyelet as described, consisting of a tubular body, open at both ends and provided at one end with an outwardly-flaring face-flange having its outer or peripheral portion turned downwardly outside the body, said downwardly-turned portion seating upon the face of the material and provided with a laterally bent or turned strengthening-lip outside the body to hold the eyelet-face in proper form against the setting thrust and thereby prevent cracking of a hard surface-coating, substantially as described.

3. A coated eyelet as described consisting of an open tubular body, thinned at one end, and provided at the other with an outwardly-flaring face-flange having its outer or peripheral portion abruptly turned downwardly outside the body, said downwardly-turned portion seated upon the face of the material and provided with a laterally bent or turned strengthening-lip outside the body to hold the eyelet-face in proper form against the setting thrust and thereby prevent cracking of its hard surface-coating, substantially as described.

In witness whereof I have hereunto signed my name this 6th day of January, 1902.

JOHN C. RHODES.

Witnesses:
A. R. WOOD,
W. E. WILSON.